United States Patent
Maiman et al.

(10) Patent No.: US 12,260,272 B2
(45) Date of Patent: *Mar. 25, 2025

(54) HYBRID CONSTRUCTION PAYMENT CARD

(71) Applicant: Capital One Services, LLC, McLean, VA (US)

(72) Inventors: Tyler Maiman, Melville, NY (US); Kevin Osborn, Newton Highlands, MA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/545,609

(22) Filed: Dec. 19, 2023

(65) Prior Publication Data

US 2024/0119245 A1 Apr. 11, 2024

Related U.S. Application Data

(63) Continuation of application No. 17/823,813, filed on Aug. 31, 2022, now Pat. No. 11,886,946.

(51) Int. Cl.
*G06K 19/02* (2006.01)
*G06K 19/077* (2006.01)

(52) U.S. Cl.
CPC ....... *G06K 19/02* (2013.01); *G06K 19/07722* (2013.01); *G06K 19/07726* (2013.01)

(58) Field of Classification Search
CPC ......... G06K 19/0723; G06K 19/07722; G06K 19/077; G06K 19/07; G06Q 20/341; G06Q 20/34

USPC ......................................................... 235/492
See application file for complete search history.

(56) References Cited

U.S. PATENT DOCUMENTS

| | | | |
|---|---|---|---|
| 3,759,610 A | 9/1973 | McVittie | |
| 10,380,476 B1 | 8/2019 | Vittimberga et al. | |
| 10,614,449 B1 | 4/2020 | Pham et al. | |
| 11,030,509 B1 | 6/2021 | Johnson et al. | |
| 11,886,946 B1 * | 1/2024 | Maiman | G06K 19/07722 |
| 2009/0184168 A1 | 7/2009 | Ricketts et al. | |

FOREIGN PATENT DOCUMENTS

| | | | | |
|---|---|---|---|---|
| JP | 2011123721 | * | 6/2011 | ........... G06K 19/077 |
| JP | 2011123721 A | | 6/2011 | |

* cited by examiner

*Primary Examiner* — Daniel St Cyr
(74) *Attorney, Agent, or Firm* — Bookoff McAndrews, PLLC

(57) ABSTRACT

Cards having a hybrid construction including a biodegradable portion and related methods are disclosed. A card can include a card body having a top surface and a bottom surface opposite the top surface, the top and bottom surfaces meeting at a peripheral edge of the card body; and a first portion secured to a second portion such that the top surface of the card body spans both the first and second portions and the bottom surface is formed entirely of the second portion. The card can further include a chip secured to the first portion of the card body; wherein the peripheral edge includes at least an insertion edge of the first portion; wherein the second portion of the card body comprises a biodegradable material; and wherein the first portion and a recyclable portion meet at a frangible junction on the top surface of the card body.

17 Claims, 4 Drawing Sheets

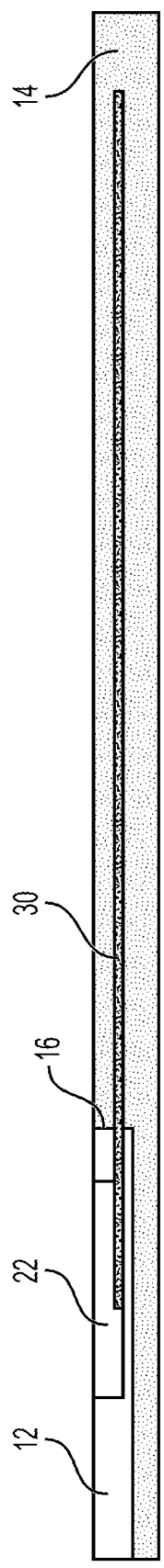
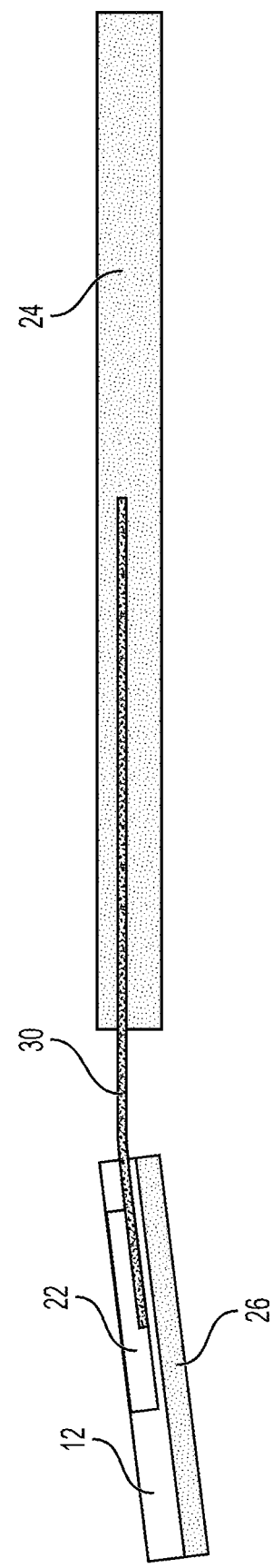
FIG. 4A
FIG. 4B

HYBRID CONSTRUCTION PAYMENT CARD

CROSS-REFERENCE TO RELATED APPLICATION(S)

This patent application is a continuation of, and claims the benefit of priority to, U.S. Nonprovisional patent application Ser. No. 17/823,813, filed on Aug. 31, 2022, the entirety of which is incorporated herein by reference.

TECHNICAL FIELD

Various embodiments of the present disclosure relate generally to payment or other transaction cards and, more particularly, to cards having a hybrid construction including a biodegradable portion.

BACKGROUND

When payment or other cards expire, are spent, or are otherwise no longer in use, they are typically thrown away. Particularly when cards include elements such as chips and/or antennae, it may be difficult to recycle any portion of a card that may even be made from a recyclable material. For example, an antenna may be integrally molded into a card, causing it to be non-recyclable. This can increase the amount of unnecessary waste, and cause otherwise recyclable material to end up in landfills.

The present disclosure is directed to overcoming one or more of these above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

According to certain aspects of the disclosure, payment or transaction cards having a hybrid construction including a biodegradable portion and related methods are disclosed. The use of hybrid construction cards may reduce the amount of plastic needed for card construction, by integrating biodegradable elements. Prior to card disposal, the card can be separated to separate a biodegradable portion.

For instance, a card can include a card body, the card body having a top surface and a bottom surface opposite the top surface, the top and bottom surfaces meeting at a peripheral edge of the card body; and a first portion secured to a second portion such that the top surface of the card body spans both the first and second portions and the bottom surface is formed entirely of the second portion. The card can further include a chip secured to the first portion of the card body; wherein the peripheral edge includes at least an insertion edge of the first portion; wherein the second portion of the card body includes a biodegradable material; and wherein the first portion and a recyclable portion meet at a frangible junction on the top surface of the card body.

A method according to the present disclosure can include providing a card body having a top surface and a bottom surface opposite the top surface, the top and bottom surfaces meeting at a peripheral edge of the card body; and a first portion adhered to a second portion, such that the top surface of the card body spans both the first and second portions and the bottom surface is formed entirely of the second portion; wherein the peripheral edge includes at least an insertion edge of the first portion; wherein the second portion of the card body includes a biodegradable material; securing a chip to the first portion of the card body; and forming a frangible junction on the top surface of the card body along which the first portion and a recyclable portion meet.

Another card may include a card body, the card body having a top surface and a bottom surface opposite the top surface, the top and bottom surfaces meeting at a peripheral edge of the card body; and a first portion secured to a second portion such that the top surface of the card body spans both the first and second portions and the bottom surface is formed entirely of the second portion. The card can further include a chip secured to the first portion of the card body; an antenna positioned at least partially within a recess in the second portion, and with at least a portion of the antenna contacting an underside of the chip; and wherein the first portion of the card body includes a plastic material, and the second portion of the card body includes a biodegradable material different from the plastic material; wherein the first portion and a recyclable portion meet at a frangible junction on the top surface of the card body.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIGS. 4A and 4B depict a lateral cross section of the exemplary card of FIG. 3 during the separation of two card portions, according to one or more embodiments of the present disclosure.

DETAILED DESCRIPTION OF EMBODIMENTS

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The term "or" is meant to be inclusive and means either, any, several, or all of the listed items. The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

In general, the present disclosure is directed to payment or transaction cards and, more particularly, to payment or transaction cards having a hybrid construction including a biodegradable portion and related methods. A card with such a hybrid construction may be durable for regular use, but can reduce the amount of non-biodegradable waste that remains after the life of the card. Some cards (e.g., credit or debit cards, membership cards, security access cards) may be intended to be used for longer than others (e.g., gift cards, transit passes, or temporary versions of other cards). Reductions of the amount of non-biodegradable material used to make a card can prevent 75% or more of the plastic typically used from needing to be disposed of, and particularly in applications having high card turnover, the reduction from each card can add up to a significant reduction in plastic waste.

Figure 1:
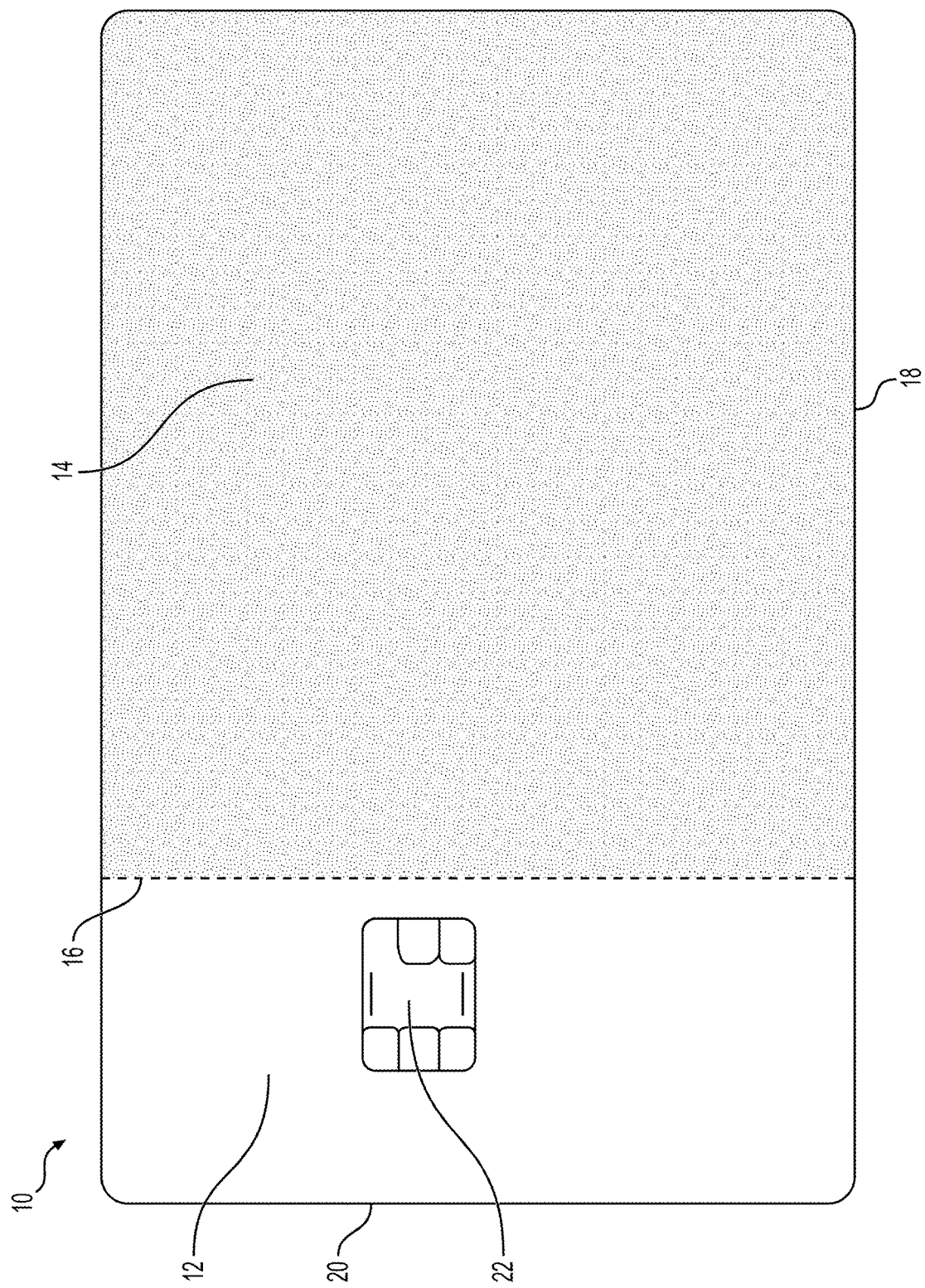
FIG. 1 depicts a top surface of an exemplary card, according to one or more embodiments of the present disclosure.

A top surface of an exemplary card 10 is depicted in FIG. 1. Card 10 can include a first portion 12 and a second portion 14. In some embodiments, second portion 14 can be made of a biodegradable material, while first portion 12 can be made of a material, such as plastic or metal, which is different from the biodegradable material. Along the top surface of card 10, the first portion 12 and the second portion 14 can meet at a frangible junction 16. Frangible junction 16 can be, for example, an indentation, perforation, or a series of indentations/perforations along a line that runs substantially between two points, the two points being along a peripheral edge 18 of card 10. The indentations/perforations of frangible junction 16 may provide a line about which card 10 may be bent, torn, or otherwise separated into two portions, and the indentations/perforations may extend partially or completely through one or both of first portion 12 and second portion 14.

In some embodiments, peripheral edge 18 can include two pairs of parallel sides, with an insertion edge 20 of first portion 12 forming at least one side of a first pair of parallel sides (e.g., a part of three adjacent sides of the two pairs of parallel sides). For example, insertion edge 20 can be the side of card 10 that is intended to be inserted into a card reader for completing a transaction, and as a result, insertion edge 20 may be subjected to more wear and tear than other sides of peripheral edge 18. In some embodiments, the material used for first portion 12 can have a surface hardness greater than that of the biodegradable material, so that insertion edge 20 may be more durable than an edge made of only biodegradable material. A second pair of parallel sides, arranged perpendicular to the first pair of parallel sides form a remainder of peripheral edge 18. As shown in FIG. 1, in one embodiment, the two points between which the frangible junction 16 runs are positioned along the first and second sides of the second pair of parallel sides.

In some embodiments, the two points between which the frangible junction 16 runs, are not located on insertion edge 20 of card 10. Because this portion of the card may experience substantial wear and tear during use, having frangible junction 16 not intersect with insertion edge 20 may help avoid prematurely weakening frangible junction 16. Other considerations for the placement of frangible junction 16 may include positioning frangible junction 16 so as to not interfere with an EMV chip 22 secured to, for example, a top surface of the first potion.

Figure 2:
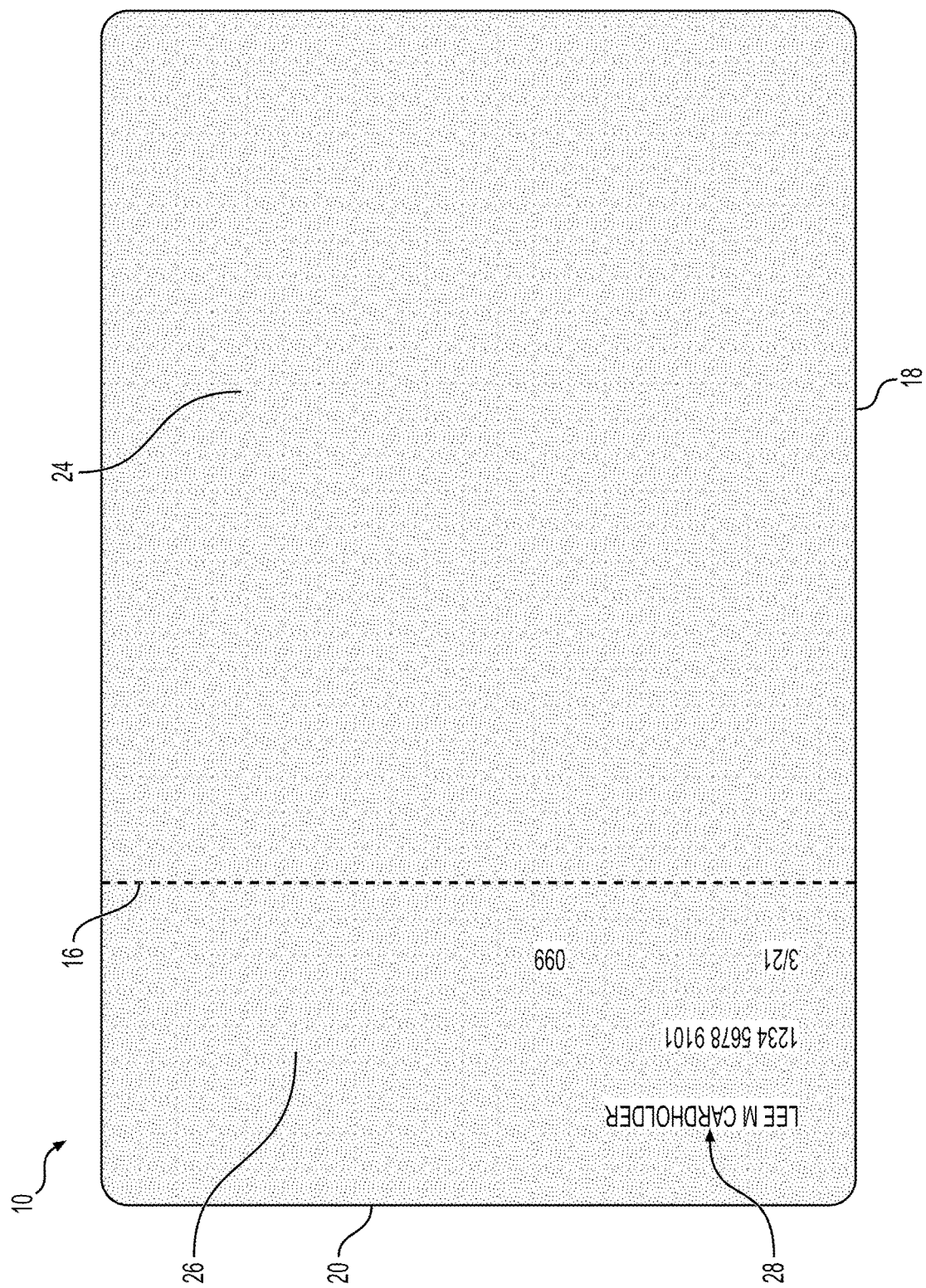
FIG. 2 depicts a bottom surface of an exemplary card, according to one or more embodiments of the present disclosure.

FIG. 2 depicts a bottom surface of card 10, such as the card depicted in FIG. 1. In some embodiments, second portion 14 may span all or substantially all of the bottom surface of card 10, such that frangible junction 16 can traverse second portion 14 (i.e., beginning on one edge of second portion 14 and extending to another edge of second portion 14) and define a recyclable portion 24 on one side of frangible junction 16, and connection portion 26 on the other side. This construction can leave most or all of the non-recyclable components to one side of frangible junction 16, thereby allowing recyclable portion 24 of second portion 14 to be recycled and/or composted.

In some embodiments, connection portion 26 of second portion 14 can also include one or more elements of visual information 28. Visual information 28 can include information such as cardholder name, account number, expiration date, card verification value number (CVV), or other information related to transacting with card 10. By including this information on one of first portion 12 and/or connection portion 26, recyclable portion 24 can remain free of confidential or personally identifiable visual information, potentially reducing the security threat posed by recycling recyclable portion 24.

Figure 3:
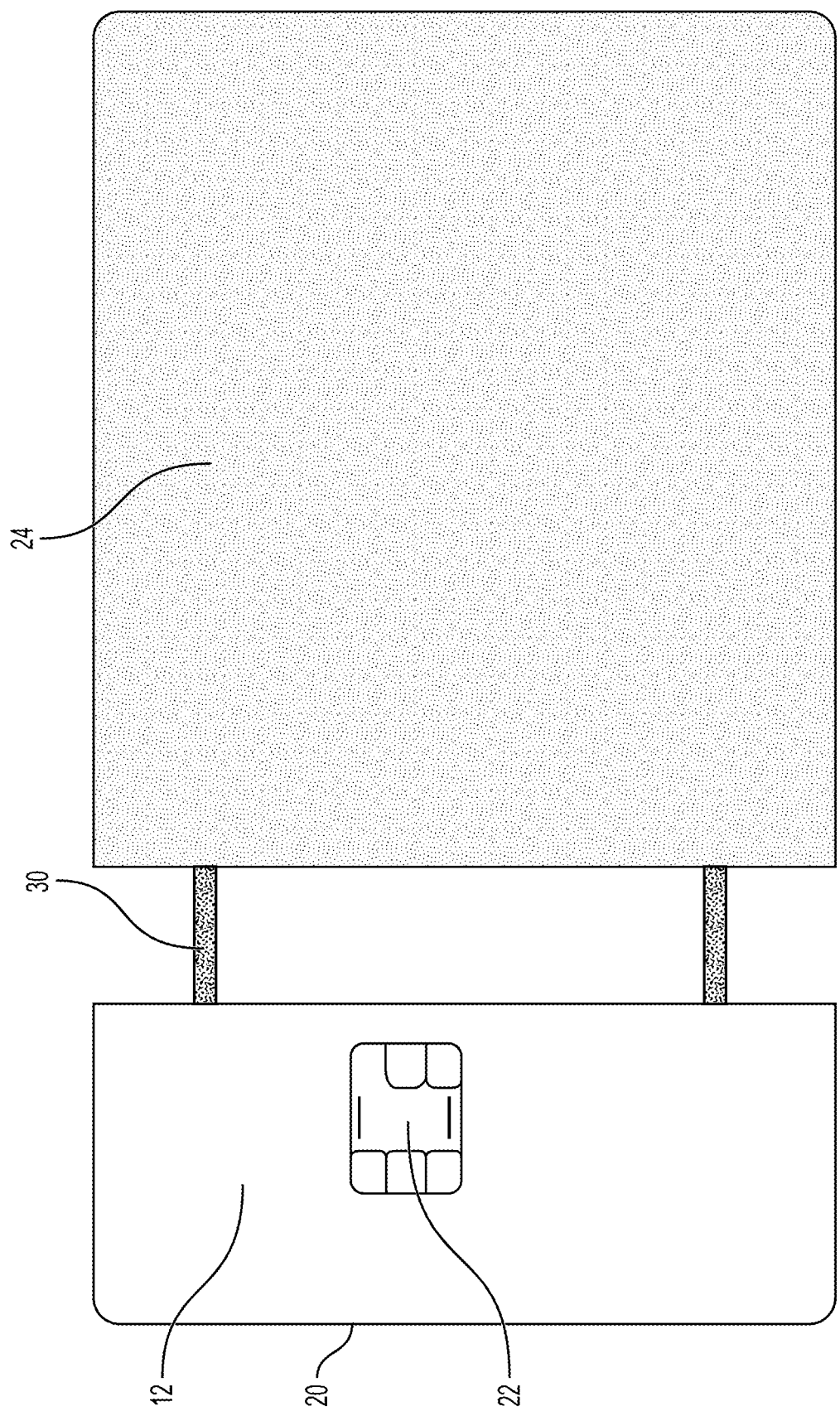
FIG. 3 depicts a top surface during the separation of two portions of an exemplary card, according to one or more embodiments of the present disclosure.

FIG. 3 depicts a top surface during the separation of two portions of an exemplary card, according to one or more embodiments of the present disclosure. Card 10 may be, for example, bent or otherwise fractured/dissected along frangible junction 16 to separate card 10 into two pieces: the recyclable portion 24 on one side, and first portion 12 and connection portion 26 on the other side.

In some embodiments, card 10 can include an antenna 30 to enable or improve the performance of contactless features of card 10. Antenna 30 may be, for example, a rectangular or oval-shaped coil of wire located inside of recyclable portion 24 and between first portion 12 and connection portion 26. In order to remove antenna 30 from the interior of recyclable portion 24, antenna 30 may be of sufficient tensile strength to allow it to be pulled out as card 10 is separated. This process is further explained with respect to FIGS. 4A and 4B.

FIGS. 4A and 4B depict a lateral cross section of card 10 of FIG. 3 prior to and during the separation of the two card portions, recyclable portion 24 and first portion 12/connection portion 26. FIG. 4A illustrates antenna 30 positioned partially within second portion 14 and between first portion 12 and second portion 14. In some embodiments, antenna 30 may be positioned within first portion 12 and/or be in contact with EMV chip 22, for example an underside of EMV chip 22. Antenna 30 may be secured under or in first portion 12 by one or more of: adhesive, mechanical constraints (e.g., staples, tape, or other engagement means such as notches, tabs, etc.), and being co-molded with first portion 12.

At the opposite end, antenna 30 may be located within a recess or fold in second portion 14. In embodiments where the removal of antenna 30 from recyclable portion 24 is desired, antenna 30 may be left loosely secured or unsecured within second portion 14. It may be beneficial to have antenna 30 more securely attached to first portion 12, so that during separation, antenna 30 remains attached to first portion 12, but is released from recyclable portion 24. FIG. 4B illustrates the separation of card 10, with antenna 30 being pulled out of recyclable portion 24 as the two card portions are moved apart. This can leave recyclable portion 24 substantially free from non-recyclable and/or biodegradable elements, such that it is suitable for reuse or environmentally friendly disposal.

An exemplary method of producing a card in accordance with the present disclosure may begin by obtaining (e.g., manufacturing, acquiring, or otherwise providing) a card body having first portion 12 being secured or adhered to second portion 14, such that the top surface of the card body spans both the first and second portions 12, 14 and the bottom surface is formed entirely of second portion 14, and wherein peripheral edge 18 includes at least an insertion edge 20 of first portion 12. First portion 12 of the card body can comprise, for example, a plastic material. Second portion 14 of the card body can comprise, for example, a biodegradable material such as bamboo, wood, paper, cardboard, or biodegradable plastics (e.g., starch or cellulose-based plastics). In some embodiments, to aid in durability, first portion 12 can be made of a material having a greater surface hardness than second portion 14, particularly along insertion edge 20.

Prior or subsequent to securing first and second portions 12, 14 to one another, a chip 22, such as an EMV chip, can be secured to first portion 12 of the card body. Frangible junction 16 can be formed on the top surface of the card body where first portion 12 and second portion 14 meet, to define recyclable portion 24 of second portion 14. Frangible junction 16 may be formed by, for example, perforating, partially perforating, scoring, or other suitable means of aiding in card separation.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above-disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations are possible within the scope of the disclosure. Accordingly, the disclosure is not to be restricted except in light of the attached claims and their equivalents.

What is claimed is:

1. A card, comprising:
    a card body having:
        a top surface and a bottom surface opposite the top surface, the top and bottom surfaces meeting at a peripheral edge of the card body; and
        a first portion secured to a second portion such that the top surface of the card body spans both the first and second portions and the bottom surface is formed entirely of the second portion,
    a chip secured to the first portion of the card body;
    wherein the peripheral edge includes at least an insertion edge of the first portion;
    wherein the peripheral edge includes two pairs of parallel sides, and wherein the insertion edge of the first portion is at least a part of three adjacent sides of the two pairs of parallel sides;
    wherein the second portion of the card body comprises a recyclable material; and
    wherein the first portion and the second portion meet at a frangible junction on the top surface of the card body.

2. The card of claim 1, wherein the first portion comprises a first material different from the recyclable material.

3. The card of claim 2, wherein the first material is a plastic material.

4. The card of claim 1, wherein the first portion has a surface hardness greater than the recyclable material.

5. The card of claim 1, wherein the second portion includes:
    a connection portion secured to the first portion; and
    a biodegradable portion separable from the connection portion along the frangible junction.

6. The card of claim 1, further comprising an antenna positioned at least partially within the second portion, and with at least a portion of the antenna contacting an underside of the chip.

7. The card of claim 6, wherein the antenna is positioned in a recess in the second portion.

8. The card of claim 7, wherein separating the first portion from the second portion along the frangible junction includes removing the antenna from the recess in the second portion.

9. A method, comprising:
    obtaining a card body having:
        a top surface and a bottom surface opposite the top surface, the top and bottom surfaces meeting at a peripheral edge of the card body; and
        a first portion adhered to a second portion, such that the top surface of the card body spans both the first and second portions and the bottom surface is formed entirely of the second portion;
        wherein the peripheral edge includes at least an insertion edge of the first portion;
        wherein the peripheral edge includes two pairs of parallel sides, and wherein the insertion edge of the first portion is at least a part of three adjacent sides of the two pairs of parallel sides;

wherein the second portion of the card body comprises a recyclable material;

securing a chip to the first portion of the card body; and forming a frangible junction on the top surface of the card body along which the first portion and the second portion meet.

10. The method of claim 9, wherein the first portion comprises a first material different from the recyclable material.

11. The method of claim 10, wherein the first material is a plastic material.

12. The method of claim 9, wherein the first portion has a surface hardness greater than the recyclable material.

13. The method of claim 9, wherein the second portion includes:

a connection portion secured to the first portion; and a biodegradable portion separable from the connection portion along the frangible junction.

14. The method of claim 9, further comprising providing an antenna at least partially within the second portion, and with at least a portion of the antenna contacting an underside of the chip.

15. The method of claim 14, wherein the second portion includes a recess, with the antenna positioned in the recess.

16. The method of claim 15, wherein separating the first portion from the second portion along the frangible junction includes removing the antenna from the recess in the second portion.

17. A card, comprising:

a card body having:

a top surface and a bottom surface opposite the top surface, the top and bottom surfaces meeting at a peripheral edge of the card body; and a first portion secured to a second portion such that the top surface of the card body spans both the first and second portions and the bottom surface is formed entirely of the second portion;

a chip secured to the first portion of the card body; and an antenna positioned at least partially within a recess in the second portion, and with at least a portion of the antenna contacting an underside of the chip;

wherein the first portion of the card body comprises a plastic material, and the second portion of the card body comprises a recyclable material different from the plastic material;

wherein the first portion and the second portion meet at a frangible junction on the top surface of the card body; and wherein the peripheral edge includes an insertion edge of the first portion, and wherein the peripheral edge includes two pairs of parallel sides, and wherein the insertion edge of the first portion is at least a part of three adjacent sides of the two pairs of parallel sides.

* * * * *